United States Patent [19]
Fujita et al.

[11] Patent Number: 5,469,415
[45] Date of Patent: Nov. 21, 1995

[54] OPTICAL INFORMATION RECORDING OR REPRODUCING APPARATUS WITH ASYMMETRY COMPENSATION

[76] Inventors: Goro Fujita; Minoru Tobita, both of c/o Sony Corporation, 7-35, Kitashinagawa 6-chome, Shinagawa-ku, Tokyo, Japan

[21] Appl. No.: 144,874

[22] Filed: Oct. 28, 1993

[30] Foreign Application Priority Data

Oct. 30, 1992 [JP] Japan .................................. 4-316580

[51] Int. Cl.⁶ ...................................................... G11B 7/00
[52] U.S. Cl. .................................. 369/48; 369/54; 369/59; 369/124
[58] Field of Search .................................. 369/59, 48, 54, 369/47, 13, 124; 360/40, 39, 114; 371/43

[56] References Cited

U.S. PATENT DOCUMENTS

| | | | |
|---|---|---|---|
| 4,688,205 | 8/1987 | Abiko | 369/59 |
| 5,155,714 | 10/1992 | Inoue | 369/13 |
| 5,243,605 | 9/1993 | Lekmine et al. | 360/40 X |

FOREIGN PATENT DOCUMENTS

| | | |
|---|---|---|
| 0504429A1 | 9/1992 | European Pat. Off. .. |
| 0538867A2 | 4/1993 | European Pat. Off. .. |
| WO90/09664 | 8/1990 | WIPO . |

OTHER PUBLICATIONS

Roger Wood, Steve Ahlgrim, Kurt Hallarnasek, and Roger Stenerson, "An Experimental Eight–Inch Disc Drive with One–Hundred Megabytes Per Surface," Ampex Corporation, Redwood City, Calif., IEEE Transactions on Magnetics, vol. mag–20, No. 5, Sep. 1984.

Primary Examiner—W. R. Young
Attorney, Agent, or Firm—Limbach & Limbach

[57] ABSTRACT

In an optical information recording or reproducing apparatus, an asymmetry detection circuit detects asymmetry values from digital RF signals reproduced from the reference area of an optical disk according to a timing signal generated by a timing signal generator. The digital RF signals are demodulated by the viterbi algorithm by a viterbi detection circuit on the basis of asymmetry values detected by an asymmetry detection circuit.

8 Claims, 5 Drawing Sheets

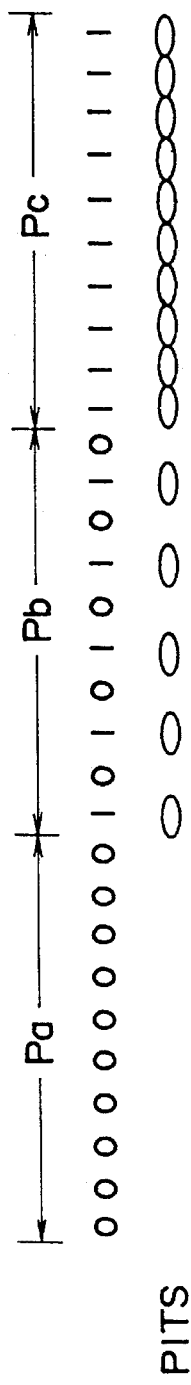
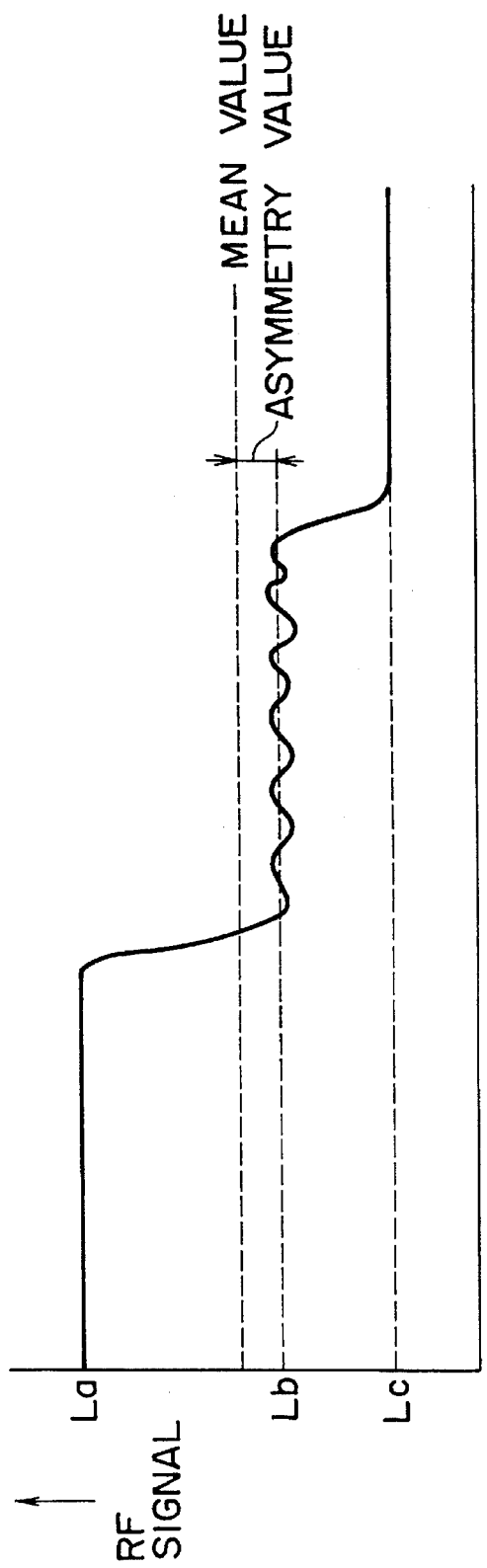

OPTICAL INFORMATION RECORDING OR REPRODUCING APPARATUS WITH ASYMMETRY COMPENSATION

TECHNICAL FIELD

The present invention relates to an optical information recording or reproducing apparatus capable of demodulating information recorded on an optical disk by the viterbi algorithm.

BACKGROUND ART

Recently, high-density recording techniques have made a remarkable progress, which is greatly indebted to improvements in recording codes, signal detecting methods and signal processing methods including decoding methods as well as to the development of high-performance recording media and recording heads. Active studies of signal processing methods have been made for magnetooptical recording employing large-capacity rewritable memories.

The magnetic field modulating method for writing information on a magnetooptical disk is capable of overwriting and is suitable for high-density edge recording. It has been reported that high-density recording can be achieved by the combination of a sampled servo tracking method and a NRZI recording method (non-return-to-zero inverted recording method) as well as by the laser pulse magnetic field modulation method. Other known methods for high-density recording are a partial response (PR) method and a viterbi decoding method. Studies of a combination of a PR(1, 1) method, i.e., one of PR methods, and the viterbi algorithm using NRZI codes have been made.

The viterbi algorithm selects the most probable code string on the basis of information about the state of transition of reproduced signals (RF signals), which is a method that enables high-density recording through signal processing, differing from a physical method that depends on the reduction of the wavelength of the laser beam. Accordingly, the detection probability of the viterbi algorithm is higher than that of a method that detects bits individually.

In the optical disk, some recording pit patterns cause intersymbol interference and hence the amplitude of the RF signal takes a ternary value. Accordingly, the viterbi algorithm selects the most probable data string for detection on the basis of information about the state of transition of the ternary value.

However, when forming a ROM pit in an optical disk or forming a data pit by light modulation, the value of asymmetry of the RF signal varies according to the variation of the power of the writing laser beam; that is, the amplitude ratio between pit signals of ternary values varies. When the value of asymmetry varies, values detected by the viterbi algorithm include errors, which deteriorate the detection performance.

SUMMARY OF THE INVENTION

Accordingly, it is an object of the present invention to provide an optical information recording or reproducing apparatus which uses a viterbi algorithm for reproducing information recorded on an optical information recording medium, comprising:

a pit information detecting means, including means for irradiating the optical information recording medium with a laser beam, for detecting pit information represented by pits recorded on the optical information recording medium;

an asymmetry detecting means supplied with the detected pit information for detecting an asymmetry value of the pit information; and a decoding means supplied with the detected pit information and the asymmetry value of the pit information for decoding the pit information on the basis of the asymmetry value by the viterbi algorithm.

Preferably, the asymmetry value is detected in a reference area of the optical information recording medium in which a specified pit pattern is formed.

Another object of the present invention is to provide an optical information recording or reproducing apparatus which uses a viterbi algorithm for decoding information recorded on an optical information recording medium so that the amplitude of a reproduced signal takes a ternary value, comprising:

a pit information detecting means, including means for irradiating the optical information recording medium with a laser beam, for detecting ternary pit information represented by pits recorded on the optical information recording medium;

a difference detecting means for detecting a difference between a maximum amplitude and a middle amplitude among the ternary pit information and outputting a corresponding first difference signal, and for detecting a difference between a minimum amplitude and the middle amplitude among the ternary pit information and outputting a corresponding second difference signal; and a decoding means for decoding reproduced signals on the basis of the first difference signal and the second difference signal by the viterbi algorithm.

Preferably, the difference between the maximum amplitude and the middle amplitude, and the difference between the minimum amplitude and the middle amplitude are detected in a reference area of the optical information recording medium in which a ternary pit pattern is recorded.

In the optical information recording or reproducing apparatus, an asymmetry detecting circuit detects the asymmetry value of the pit information, and a viterbi circuit demodulates the pit information on the basis of the asymmetry value by a viterbi algorithm. Therefore, a most probable data string is selected on the basis of the state of transition of the pit information by the viterbi algorithm for reliable, simple information detection even when the the asymmetry value of the pit information varies according to the variation of the power of the writing means.

The asymmetry detecting circuit is capable of accurately detecting the asymmetry value in the reference area of an optical disk in which a predetermined pit pattern is recorded and of accurately and simply detecting information even if the asymmetry value varies.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIGS. 3(a) and 3(b) are diagrammatic views of assistance in explaining RF signals reproduced by the optical information recording or reproducing apparatus of FIG. 1;

DESCRIPTION OF THE PREFERRED EMBODIMENTS

A preferred embodiment of the present invention will be described hereinafter with reference to the accompanying drawings.

Figure 1:
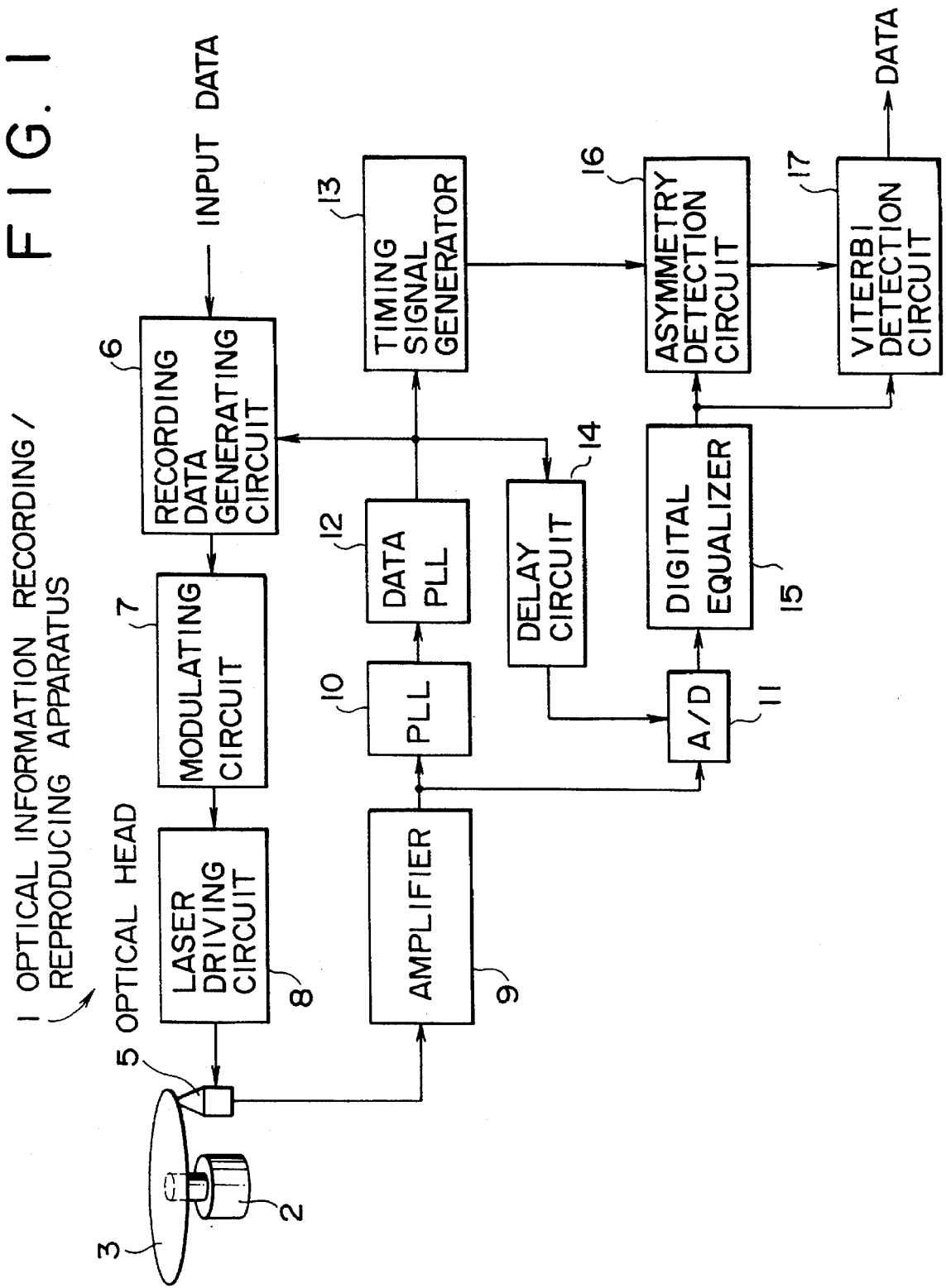
FIG. 1 is a block diagram of an optical information recording or reproducing apparatus in a preferred embodiment according to the present invention.

Referring to FIG. 1, an optical information recording or reproducing apparatus 1 in a preferred embodiment according to the present invention is provided with a spindle motor 2 for driving a WORM type (write once read many type) optical disk 3, and an optical head 5 for recording information on the optical disk by irradiating the recording surface of the optical disk 3 with a modulated laser beam.

A recording data generating circuit 6 generates recording data corresponding to input data and gives the recording data to a modulating circuit 7. The modulating circuit 7 modulates the recording data and gives modulated recording data to a laser driving circuit 8, and then the laser driving circuit drives a semiconductor laser, such as a laser diode, not shown, included in the optical head 5 according to the modulated recording signal.

The optical head 5 is provided with a detector, not shown, which irradiates the optical disk 3 with a laser beam of a power lower than that of the recording laser beam and detects RF signals from the reflected laser beam. The RF signals detected by the optical head 5 are transferred through an amplifier 9 to a phase-locked-loop (PLL) circuit 10 and an analog to digital (A/D) converter 11. The PLL circuit 10 generates a clock signal synchronous with clock pits prerecorded on the optical disk 3 and applies the clock signal to a data PLL circuit 12. Then, the data PLL circuit 12 generates a data clock signal on the basis of the clock signal and gives the data clock signal to the recording data generating circuit 6, a timing signal generator 13 and a delay circuit 14. The recording data generating circuit 6 generates the recording data on the basis of the input data in synchronism with the data clock signal. The timing signal generator 13 generates timing signals on the basis of the data clock signal.

The delay circuit 14 delays the data clock signal and gives a delayed data clock signal to control an A/D converter 11. In synchronism with the delayed data clock signal, the A/D converter 11 converts the analog RF signals from the amplifier 9 to corresponding digital signals. A digital equalizer 15 shapes digital signals provided by the A/D converter 11 to provide digital RF signals. An asymmetry detection circuit 16 detects an asymmetry value from the digital RF signals in the reference area of the optical disk 3 on the basis of the timing signal provided by the timing signal generator 13. The digital RF signals are demodulated by a viterbi detection circuit 17 on the basis of the asymmetry value detected by the asymmetry detection circuit 16.

Figure 2:
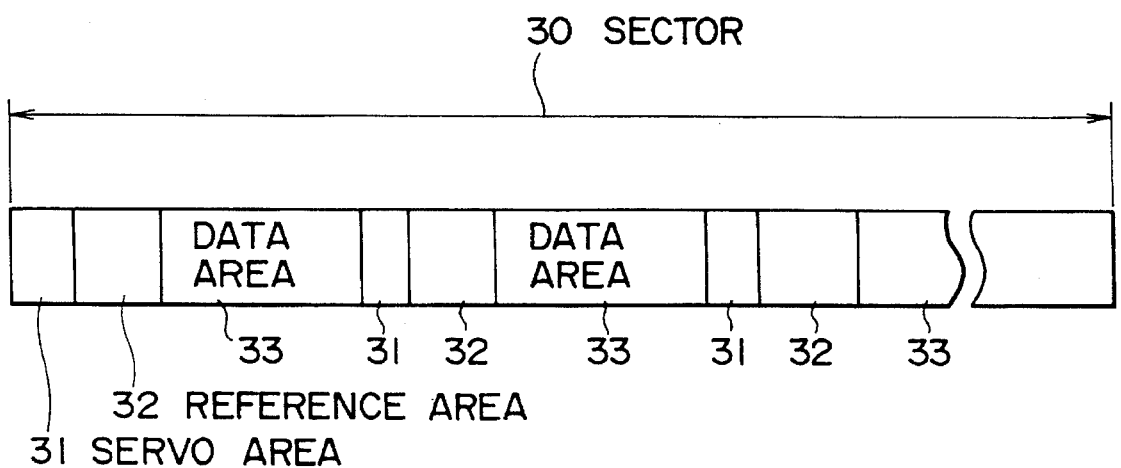
FIG. 2 is a diagrammatic view of a sector of an optical disk employed in the optical information recording or reproducing apparatus of FIG. 1.
Figure 4:
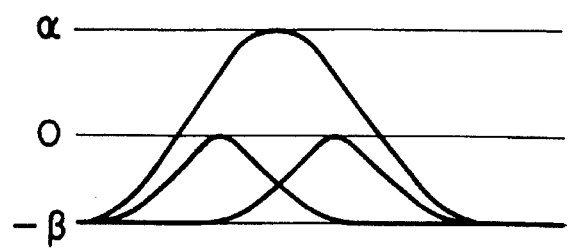
FIG. 4 is a diagram of assistance in explaining the viterbi algorithm to be executed by a viterbi detection circuit included in the optical information recording or reproducing apparatus of FIG. 1, showing the waveforms of RF signals.

The optical disk 3 has a plurality of concentric or spiral tracks. The tracks are divided into a plurality of sectors 30 as shown in FIG. 2. A piece of information is recorded in each sector 30 or a piece of information recorded in each sector 30 is reproduced. Each sector 30 has a plurality of segments, each segment having a servo area 31 provided with pre-pits, including a clock pit, a reference area 32 in which specified pit patterns are recorded, and a data area 33 in which data is recorded.

The reference area 32 need not necessarily be formed in each segment but instead can be formed in each sector 30.

As shown in FIG. 3(a), the specified pit patterns formed in the reference area 32 are a first pit pattern Pa consisting of pits "0 0 0 0 . . . 0, a second pit pattern Pb consisting of pits "1 0 1 0 . . . 0", and a third pit pattern Pc consisting of pits "1 1 1 1 . . . 1". As shown in FIG. 3(b), RF signals represented by the specified pit pattern are ternary values.

The level of the RF signal represented by the first pit pattern Pa is the highest level La because the first pit pattern Pa has no pit and the level of the RF signal represented by the third pattern Pc is the lowest level Lc. Ideally, the level Lb of the RF signal represented by the second pattern Pb is expected to be the mean level between the highest level La and the lowest level Lc, namely, (La+Lc)/2. However, since the size of the pits varies according to the variation of the power of the laser beam, the level Lb deviates from the ideal level by an asymmetry value. Therefore, the asymmetry detection circuit 16 detects the asymmetry value on the basis of the ternary values La, Lb and Lc. The output signal of the asymmetry detection circuit 16 is given to the viterbi detection circuit 17. The viterbi detection circuit 17 executes viterbi decoding in the following manner on the basis of the output signal of the asymmetry detection circuit 16.

In the PR(1, 1) method, since-intersymbol interference is caused by the pit pattern, the RF signal takes ternary values $\alpha$, 0 and $-\beta$ (in FIG. 3(b), $\alpha$=La, 0=Lb and $-\beta$=Lc). In the viterbi algorithm, an output Yk corresponding to an input bit Ak is:

$$Y_k = \alpha \quad (1)$$

when (Ak, Ak−1)=(1, 1), $$Y_k = 0 \quad (2)$$

when (Ak, Ak−1)=(1, −1) or (−1, 1) or $$Y_k = -\beta \quad (3)$$

when (Ak, Ak−1)=(−1, −1)

Accordingly, the likelihood Lk(+) that Ak=+1 is expressed by:

$$L_k(+) = \max\{L_{k-1}(+) + [-(Y_k - \alpha)^2], L_{k-1}(-) + [-(Y_k - 0)^2]\} \quad (3)$$

where max{a, b} signifies the selection of the greater of the values a and b. Since the likelihood Lk(+) signifies that Ak=+1, and (Yk−)² in the expression (4) is the square of the difference between the output Yk and the expected signal level $\alpha$, the likelihood Lk(+) increases with the decrease of the square of the difference. Therefore, if $$A = L_{k-1}(+) + [-(Y_k - \alpha)^2] \quad (5)$$

$$B = Lk-1(-)+[-(Yk-0)^2] \quad (6)$$

Figure 5A:
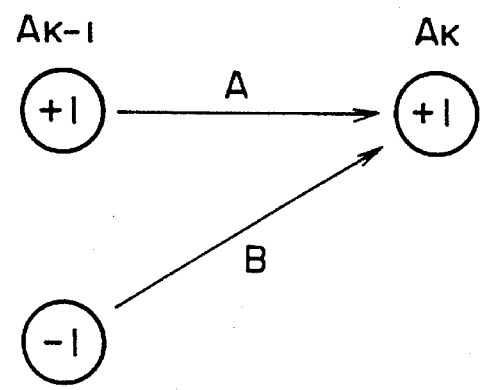
FIGS. 5(a), 5(b) and 5(c) are diagrams of assistance in explaining the influence of the transition of the input bit on the output when the viterbi detection circuit of the optical information recording or reproducing apparatus of FIG. 1 executes the viterbi algorithm.
Figure 5B:
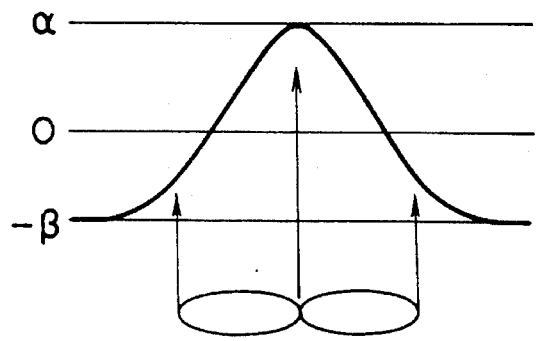
Figure 5C:
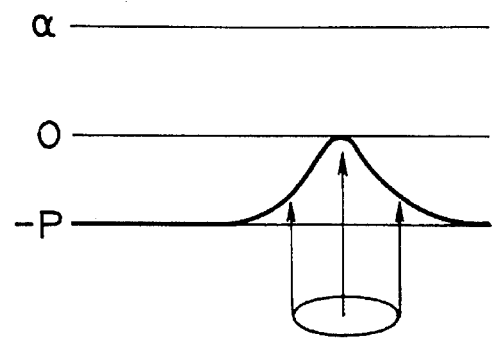

$Lk(+) = A$ for a pattern where $Ak-1=+1$ and $Ak=+1$ as shown in FIG. 5(b), and $Lk(+) = B$ for a pattern where $Ak-1=-1$ and $Ak=+1$ as shown in FIG. 5(c) for the transition of the input bit $Ak$ as shown in FIG. 5(a).

Similarly, the likelihood $Lk(-)$ that $Ak=-1$ is $$Lk(-) = \max\{Lk-1(+)+[-(Yk-0)^2], Lk-1(-)+[-(Yk+\beta)^2]\} \quad (7)$$

The terms of the expression (7) are represented by:

$$C = Lk-1(+)+[-(Yk-0)^2] \quad (8)$$

$$D = Lk-1(-)+[-(Yk+\beta)^2] \quad (9)$$

Then, to compare the likelihood $Lk(+)$ and the likelihood $Lk(-)$, $$\Delta Lk = Lk(+)-Lk(-) \quad (10)$$

The transition path of the data can be determined from the expression (10).

(1) $\Delta Lk = 2\alpha Yk - \alpha^2$ when
A>B and C>D:

$$\Delta Lk-1+2\alpha Yk-\alpha^2 > 0 \text{ and}$$

$$\Delta Lk-1+2\beta Yk+\beta^2 > 0 \quad (11)$$

(2) $\Delta Lk = -\Delta Lk-1$ when
A<B and C>D:

$$\Delta Lk-1+2\alpha Yk-\alpha^2 < 0 \text{ and}$$

$$\Delta Lk-1+2\beta Yk+\beta^2 > 0 \quad (12)$$

(3) $\Delta Lk = 2\beta Yk + \alpha^2$ when
A<B and C>D:

$$\Delta Lk-1+2\alpha Yk-\alpha^2 < 0 \text{ and}$$

$$\Delta Lk-1+2\beta Yk+\beta^2 < 0 \quad (13)$$

Figure 6A:
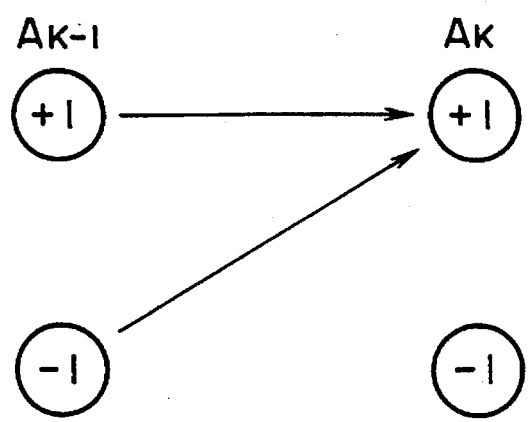
FIGS. 6(a), 6(b) and 6(c) are diagrams of assistance in explaining the transition path of data determined by the viterbi detection circuit of the optical information recording or reproducing apparatus of FIG. 1.
Figure 6B:
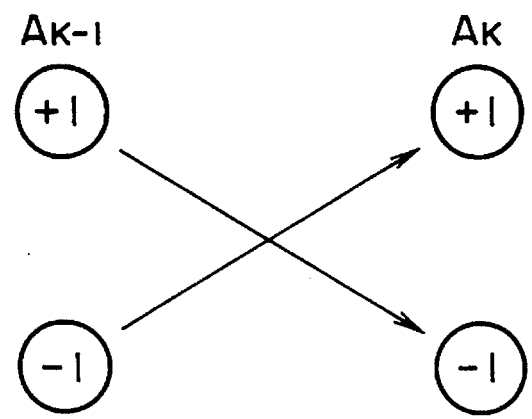
Figure 6C:
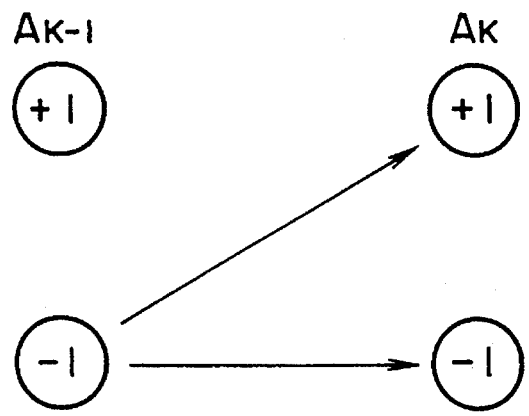

The viterbi detection circuit 17 executes its calculations by using the expressions (11), (12) and (13). The transition of the data takes a transition pattern shown in FIG. 6(a) when the condition expressed by the expression (11) is satisfied, a transition pattern shown in FIG. 6(b) when the condition expressed by the expression (12) is satisfied or a pattern shown in FIG. 6(c) when the condition expressed by the expression (13) is satisfied.

Thus, the optical recording or reproducing apparatus 1 embodying the present invention has a simple configuration and is capable of demodulating data even if the RF signal has an asymmetry value by detecting the asymmetry value of the RF signal resulting from the variation of the power of the writing laser beam and demodulating the data by the viterbi algorithm on the basis of the asymmetry value.

The recording medium need not necessarily be a WORM optical disk; the recording medium may be a ROM disk storing information. Naturally, the present invention is applicable to a ROM disk reproducing apparatus capable of producing a correction table for asymmetry values of RF signals caused by a variation of power of the writing laser beam used for writing information in the optical disk, of correcting the RF signals on the basis of the correction table, and of demodulating data by the viterbi algorithm.

The present invention is also capable of detecting information recorded by light modulation on a magnetooptic disk by the viterbi algorithm.

Although the present invention has been shown and described with respect to preferred embodiments, various changes and modifications which are obvious to a person skilled in the art to which the invention pertains are deemed to lie within the spirit and scope of the invention as claimed.

What is claimed is:

1. An optical information recording/reproducing apparatus which uses a viterbi algorithm for reproducing information recorded on an optical information recording medium, comprising:

a pit information detecting means, including means for irradiating the optical information recording medium with a laser beam, for detecting pit information represented by pits recorded on the optical information recording medium;

an asymmetry detecting means supplied with the detected pit information for detecting an asymmetry value of the pit information; and a decoding means supplied with the detected pit information and the asymmetry value of the pit information for decoding the pit information on the basis of the asymmetry value by the viterbi algorithm wherein the asymmetry value detected by the detecting means is a difference between a mean value (La+Lc)/2 of the pit information and an intermediate value Lb of the pit information, where La is a maximum value of the pit information, Lc is a minimum value of the pit information, and Lb is a ternary value of the pit information which is between La and Lc.

2. An optical information recording/reproducing apparatus according to claim 1, wherein the asymmetry detecting means detects the asymmetry value in a reference area in which a specified pit pattern is recorded on the optical information recording medium.

3. An optical information recording/reproducing apparatus according to claim 2, wherein the optical information recording medium is a read only memory (ROM) disk storing information previously recorded thereon.

4. An optical information recording/reproducing apparatus according to claim 2, wherein the optical information recording medium is a magnetooptic disk of a light modulation type.

5. An optical information recording/reproducing apparatus which uses a viterbi algorithm for decoding information recorded on an optical information recording medium so that the amplitude of a reproduced signal takes a ternary value, comprising:

a pit information detecting means, including means for irradiating the optical information recording medium with a laser beam, for detecting ternary pit information represented by pits recorded on the optical information recording medium;

a difference detecting means for detecting a difference between a maximum amplitude and a middle amplitude among the ternary pit information and outputting a corresponding first difference signal, and for detecting a difference between a minimum amplitude and the middle amplitude among the ternary pit information and outputting a corresponding second difference signal; and a decoding means for decoding reproduced signals on the basis of the first difference signal and the second difference signal by the viterbi algorithm.

6. An optical information recording/reproducing apparatus according to claim 5, wherein the difference detecting means detects the difference between the maximum amplitude and the middle amplitude, and the difference between the minimum amplitude and the middle amplitude in a reference area in which ternary pit patterns are recorded on the optical information recording medium.

7. An optical information recording/reproducing apparatus according to claim 5, wherein the optical information recording medium is a read only memory (ROM) disk storing information previously recorded thereon.

8. An optical information recording/reproducing apparatus according to claim 5, wherein the optical information recording medium is a magnetooptic disk of a light modulation type.

* * * * *

UNITED STATES PATENT AND TRADEMARK OFFICE
CERTIFICATE OF CORRECTION

PATENT NO. : 5,469,415
DATED : November 21, 1995
INVENTOR(S) : Goro Fujita; Minoru Tobita It is certified that error appears in the above-indentified patent and that said Letters Patent is hereby corrected as shown below:

In Col. 5, line 38, please change "$\Delta Lk = 2\beta Yk + \alpha^2$ when" to
--$\Delta Lk = 2\alpha Yk + \alpha^2$ when--.

Signed and Sealed this

Nineteenth Day of March, 1996

*Attest:*

BRUCE LEHMAN

*Attesting Officer*       *Commissioner of Patents and Trademarks*

UNITED STATES PATENT AND TRADEMARK OFFICE
CERTIFICATE OF CORRECTION

PATENT NO.  : 5,469,415
DATED       : November 21, 1995
INVENTOR(S) : Goro Fujita It is certified that error appears in the above-indentified patent and that said Letters Patent is hereby corrected as shown below:

Title page, item [73], Assignee:   should read --Sony Corporation, Japan--

Signed and Sealed this

Seventh Day of May, 1996

Attest:

BRUCE LEHMAN

*Attesting Officer*    *Commissioner of Patents and Trademarks*